United States Patent [19]
Mestetsky et al.

[11] 3,803,068
[45] Apr. 9, 1974

[54] RELEASE COATING COMPOSITIONS

[75] Inventors: Thomas Samuel Mestetsky; Edwin Marvin Smolin, both of Easton, Pa.

[73] Assignee: GAF Corporation, New York, N.Y.

[22] Filed: Dec. 17, 1971

[21] Appl. No.: 209,455

[52] U.S. Cl....... 260/29.6 MP, 106/38.22, 156/289, 260/33.2 R, 260/33.6 UA
[51] Int. Cl............................................ C21d 17/00
[58] Field of Search............... 260/78.5 T, 29.6 MP, 260/33.6 UA, 33.2, 78.5 R; 106/38.22; 117/5.1, 5.3; 264/338; 156/289; 252/DIG. 3

[56] References Cited
UNITED STATES PATENTS
3,248,350 4/1966 Triggle .................. 260/29.6 MP
3,630,920 12/1971 Freifeld et al. .............. 252/DIG. 3

*Primary Examiner*—Morris Liebman
*Assistant Examiner*—S. M. Person
*Attorney, Agent, or Firm*—Walter C. Kehm, S. B. Leavitt

[57] ABSTRACT

Release coating compositions consisting of mixtures of hydrolyzed alkyl vinyl ether-maleic anhydride copolymers and surfactants.

7 Claims, No Drawings

RELEASE COATING COMPOSITIONS

The present invention relates to release coating compositions consisting of mixtures of higher alkyl vinyl ether-maleic anhydride copolymers and surfactants and the use of such compositions.

Release coatings are coatings which are applied to a substrate to prevent or decrease the adhesion of another substance to it. The nature of the release is a measure of the degree of adhesion which a sticky or tacky substance displays toward an adhesive coating. Release coatings are widely used as mold release agents, as pressure sensitive label backings and as coatings for containers to facilitate removal of the contents thereof.

Higher alkyl (C8-C22) vinyl ether-maleic anhydride copolymers have been employed widely as release coatings because they are capable of providing excellent release properties.

It is an object of the present invention to provide hydrolyzed higher alkyl (C8-C22) vinyl ether-maleic anhydride release coating compositions having improved properties.

It is another object of the invention to provide hydrolyzed higher alkyl (C8-C22) vinyl ether-mateic anhydride release coating compositions which are inexpensive and effective.

Still another object of the invention is to provide release coating compositions to suit the varying release requirements of the paper industry.

Other objects of this invention will be apparent from the following descriptions.

It has been discovered, in accordance with the present invention, that an improved release coating composition is provided by a mixture of higher alkyl (C8-C22) vinyl ether-maleic anhydride copolymer and a surfactant.

Higher alkyl vinyl ether-maleic anhydride copolymers include for example octyl vinyl ether-, octadecyl vinyl ether-, stearyl vinyl ether-, dodecyl vinyl ether- and tetradecyl vinyl ether-maleic anhydride copolymers. On addition to water or in the presence of moisture, the maleic anhydride component is converted to maleic acid and a hydrolyzed higher alkyl vinyl ether-maleic anhydride copolymer is formed which is alternatively referred to as higher alkyl vinyl ether-maleic acid copolymer.

As surfactants, there have proved suitable for use in forming the mixtures of the invention, materials having the formula $$R-O-(CH_2CH_2O)_n-X$$

wherein R is alkyl, isoalkyl, alkylphenyl or isoalkyphenyl, alkyl in each case being C8-C20 alkyl, $n$ is 0 to 5 and X is a sulfate or phosphate ester in either free acid or ammonium salt or alkali metal salt form.

The ratio of surfactant to higher alkyl vinyl ether-maleic anhydride copolymer may range from 1:1 to 16:1 with the ratio of higher alkyl vinyl ether-maleic anhydride copolymer to surfactant in the mixture and the properties of the higher alkyl vinyl ether-maleic anhydride copolymer determining the release properties of the resulting coating.

The release coating compositions of the present invention may be applied to a surface by conventional air knife, trailing blade, roll spraying, printing or casting methods. The release coating composition of the present invention can be applied to a wide variety of surfaces to take advantage of their release properties. They can be used as mold release agents on bakery pans and candy trays. Likewise they can be used on paper, plastics and metal foils to provide release coatings when these materials are made into containers for such products as asphalt, wax, resin and the like. They can also be used to coat multi-wall bags and cartons which will contain rubber and to coat cartons which will contain candy, baked goods and other sticky products. They are also useful to coat backing sheets for pressure sensitive tapes, labels, tags, decals, self-bonding wallpaper, decorative plastics and asphalt impregnated pipe wrapping. Thus, in general, they can be used to coat any type of material such as the cellulosics (e.g. bleach sulphate, clay coated kraft, glassine, parchment, tissue and the like) and plastics such as nylon, polyacrylonitrile, polyesters, styrene, vinyl plastics, polyurethanes and other organic resin materials. Moreover, they are also applicable to inorganic materials such as ceramics or metals such as aluminum, magnesium, copper, steel or zinc.

The following examples are presented to further illustrate the present invention and are in no wise to be construed as a limitation of the scope thereof.

EXAMPLE I

A mixture of 5 g. of a solution of 40 percent alkyl vinyl ether-maleic anhydride (consisting of 63–66 percent C18 alkyl vinyl ether, 25–30 percent C16 alkyl vinyl ether, 4–6 percent C14 alkyl vinyl ether, 2–3 percent C12 alkyl vinyl ether and 0.3 percent C10 alkyl vinyl ether copolymerized with maleic anhydride in toluene and 5 g. of a surfactant corresponding to the formula given above, wherein R is stearyl, $n$ is 2 and X is the free acid form of the phosphate ester were mixed together, placed in a capped jar and heated at 90°C. for 15 minutes.

The resultant mixture was clear, but on cooling phased out 0.5 g. of distilled water were added to the cooled mixture and the resultant product again heated at 90°C. for 20 minutes. The resultant mixture was a clear solution and remained clear even when cooled.

The cooled mixture was coated onto a bond paper (20 pounds per 17 in. × 22 in. 500 sheet ream) with an 0.0005 in. aperture Bird applicator. The coating was allowed to dry for 3 minutes at 120°C. The coating which was thereby obtained was clear and had a fair water repellency. The release force amounted to 100 g. per inch width with no fiber pull as compared to 400 g. per inch width with 100 percent fiber pull for uncoated paper. (The test was carried out by pressing Mystic 6450 tape against the coating with a 4.5 pound roller and applying a pulling force with a spring balance.)

EXAMPLE II

Using the same components as have been set out in Example I, a series of mixtures were prepared containing from 1 to 6 parts of the surfactant per part of alkyl vinyl ether-maleic anhydride. 5 percent distilled water based on the weight of the solution of 40 percent alkyl vinyl ether-maleic anhydride in toluene was added and the solids content adjusted to 5 percent with toluene. The resultant mixtures were heated at 90°C. for 1 hour, then coated using the same procedure as set out in Example I except that the substrate coated was a 25 pound per 3,000 sq. ft. glassine paper.

Tests for evaluating the release properties of the coating compositions were then carried out as follows:

A. Immediate Release: A strip of Mystic 6450 cellophane tape was pressed against the release surface using a 4.5 pound roller. The tape was immediately removed in T-peel using an Instron tensile tester at 10 inches per minute. The work to remove a total of 15 inches of tape divided by the tape length was taken as release force (pounds/inch width).

B. Accelerated Aging Release: A strip of Johnson and Johnson Red Cross adhesive tape was pressed against the release surface using a Carver press at 2,100 p.s.i. against 18 square inches of tape surface (about 116 p.s.i.). The resultant structures were conditioned overnight at 23°C., 50 percent relative humidity, before testing in the same manner as in the immediate release procedure described above.

C. Retained Adhesion: The adhesion of the tapes used for the release tests was measured according to the method of PSTC-1 (Pressure Sensitive Tape Council — 180° Peel Adhesion).

The results of the tests are set out in Table I which follows.

The table indicates that the release characteristics are improved as the ratio of the complex organic surfactant to alkyl vinyl ether-maleic anhydride is increased up to 16 parts of complex organic phosphate ester per part of alkyl vinyl ether-maleic anhydride. The retained adhesion is approximately equal to that of the unmodified alkyl vinyl ether-maleic anhydride at up to 4 parts of surfactant for the immediate release tests and up to 8 parts for the accelerated aging release.

EXAMPLE III

A series of experiments was carried out in which a different batch of alkyl vinyl ether-maleic anhydride in toluene having an accelerated aging release about 25 percent lower than that of the batch utilized in Examples I and II was used.

The surfactants were evaluated in the form of their mixtures with the alkyl vinyl ether-maleic anhydride toluene solution at ratios of up to 16 parts surfactant per part alkyl vinyl ether-maleic anhydride. The coatings were prepared and tested for accelerated aging release as described in Example II above.

The results of the experiments are set out in Table II which appears hereinafter and indicates the following:

1. The surfactant where R is nonylphenol, $n$ is 5 and X is the sulfate ester ammonium salt evidenced release properties amounting to about 20 percent over the unmodified alkyl vinyl ether-maleic anhydride at 1 to 4 parts of the surfactant per part of alkyl vinyl ether-maleic anhydride. At higher surfactant levels, the release was equivalent to the unmodified alkyl vinyl ether-maleic anhydride.

2. The surfactant where R is isoctyl, $n$ is 0 and X is the phosphate ester free acid evidenced improved release properties of about 20 percent at 1 part of the surfactant per part of alkyl vinyl ether-maleic anhydride. As the level of the surfactant was increased, the release declined becoming inferior to unmodified alkyl vinyl ether-maleic anhydride at levels at or above 4 parts per part of alkyl vinyl ether-maleic anhydride.

TABLE I

Mixtures of 40% alkyl vinyl ether-maleic anhydride in Toluene and Surfactant

| | | | | | | | |
|---|---|---|---|---|---|---|---|
| I. | Ratio-surfactant: alkyl vinyl ether-maleic anhydride | 0/1 | 1/1 | 2/1 | 4/1 | 8/1 | 16/1 |
| II. | Immediate Release (Lb/inch width) | 0.36 | 0.22 | 0.18 | 0.19 | 0.21 | 0.19 |
| | Subsequent Retained Adhesion (lb/inch width) | 1.8 | 1.8 | 1.9 | 1.8 | 1.5 | 1.3 |
| III. | Accelerated Aging Release (lb/inch width) | 1.2 | 0.74 | 0.72 | 0.72 | 0.69 | 0.64 |
| | Subsequent Retained Adhesion (lb/inch width) | 1.3 | 1.5 | 1.4 | 1.4 | 1.3 | 1.3 |

TABLE II

Mixtures of 40% ODVE/MA in Toluene With Each of 2 Surfactants

| Surfactant R-O-(CH₂CH₂O)ₙ-X | | Ratio: Surfactant to ODVE/MA 40% in Toluene | Ratio: Surfactant to ODVE/MA | Solids of Coating Solution | Accelerated Aging Release |
|---|---|---|---|---|---|
| R | n | | | | |
| None | | 0/1 | 0/1 | 5% | 0.85 |
| Nonylphenol ($-SO_3NH_4$) | 5 | 0.4/1 | 1/1 | 5% | 0.69 |
| | | 0.8/1 | 2/1 | 5% | 0.69 |
| | | 1.6/1 | 4/1 | 5% | 0.69 |
| | | 3.2/1 | 8/1 | 5% | 0.87 |
| | | 6.4/1 | 16/1 | 5% | 0.78 |
| Isoctyl (free acid) | 0 | 0.4/1 | 1/1 | 5% | 0.70 |
| | | 0.8/1 | 2/1 | 5% | 0.78 |
| | | 1.6/1 | 4/1 | 5% | 0.92 |
| | | 3.2/1 | 8/1 | 5% | 1.12 |
| | | 6.4/1 | 16/1 | 5% | 1.14 |

We claim:

1. A release coating composition comprising one part of a hydrolyzed alkyl vinyl ether maleic anhydride copolymer containing from 8–22 carbon atoms in the alkyl moiety thereof wherein said alkyl vinyl ether is present in said copolymer in an amount of from 30–50 mole percent and said maleic anhydride in an amount of from 50–70 mole percent and from one to sixteen parts of surfactant corresponding to the formula $$R-O-(CH_2CH_2O)_n-X$$

wherein R is alkyl, alkylphenyl or isoalkylphenyl wherein alkyl contains 8–20 carbon atoms, $n$ is 0 to 5 and X is a sulphate or phosphate ester in either free acid, ammonium salt or alkali metal salt form.

2. A release coating composition according to claim 1 wherein said hydrolyzed vinyl ether-maliec anhydride copolymer is predominantly hydrolyzed octadecyl vinyl ether-maleic anhydride copolymer.

3. A release coating composition according to claim 1 comprising a mixture of 40 percent alkyl vinyl ether-maleic anhydride in toluene with a surfactant wherein R is stearyl, $n$ is 2 and X is a phosphate ester in free acid form.

4. A release coating composition according to claim 1 comprising a mixture of 40 percent alkyl vinyl ether-maleic anhydride in toluene with a surfactant wherein R is nonylphenol, $n$ is 5 and X is a sulfate ester in ammonium salt form.

5. A release coating composition according to claim 1 comprising a mixture of 40 percent alkyl vinyl ether-maleic anhydride in toluene with a surfactant wherein R is isooctyl, $n$ is 0 and X is a phosphate ester in free acid form.

6. A method of treating a surface to impart release properties thereto which comprises applying thereto a release coating composition as defined in claim 1.

7. An article comprising a release coated surface produced by the method of claim 6.

* * * * *